United States Patent

[11] 3,576,303

| [72] | Inventor | Carl G. Matson<br>401 E. Central Blvd., Kewanee, Ill. 61443 |
|---|---|---|
| [21] | Appl. No. | 828,258 |
| [22] | Filed | May 27, 1969 |
| [45] | Patented | Apr. 27, 1971 |

[54] MOUNT FOR VIBRATORS
1 Claim, 7 Drawing Figs.
[52] U.S. Cl. .................................................. 248/14,
248/223
[51] Int. Cl. ....................................................F16m 13/00
[50] Field of Search ........................................... 248/223,
224, 225, 14, 73; 214/64.2

[56] References Cited
UNITED STATES PATENTS

| 807,888 | 12/1905 | Wallace.......................... | 248/224 |
| 3,420,480 | 1/1969 | Matson.......................... | 248/14 |
| 3,468,504 | 9/1969 | Matson.......................... | 248/14 |

*Primary Examiner*—Roy D. Frazier
*Assistant Examiner*—J. Franklin Foss
*Attorney*—Harold M. Knoth ABSTRACT: A mount for attaching vibrators to containers such as concrete molds and the like is made up of a plurality of walls affording a boxlike structure in which the end walls are divergent so as to receive the matching legs of a secondary element which may be part of or an attachment to the vibrator, together with clamp screws that draw the mating surfaces together to provide a rigid mounting in which the vibrator becomes in effect a part of the container to be vibrated.

INVENTOR.
C. G. MATSON

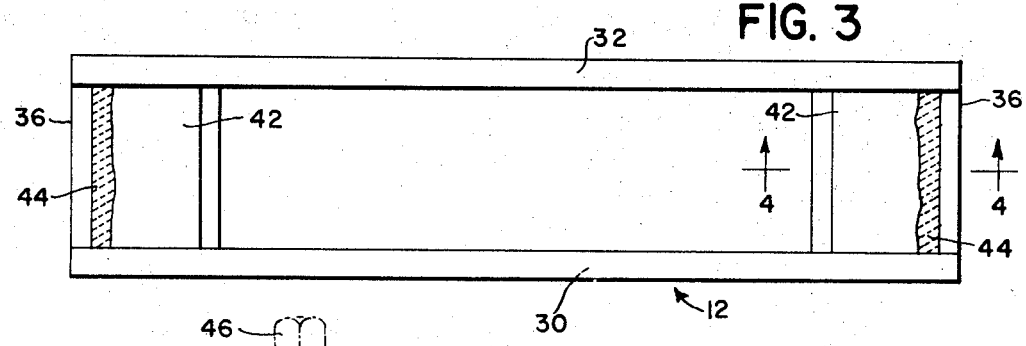
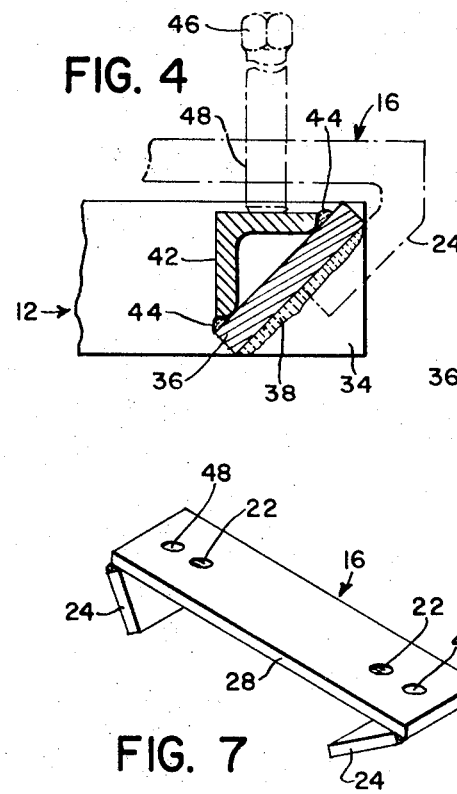
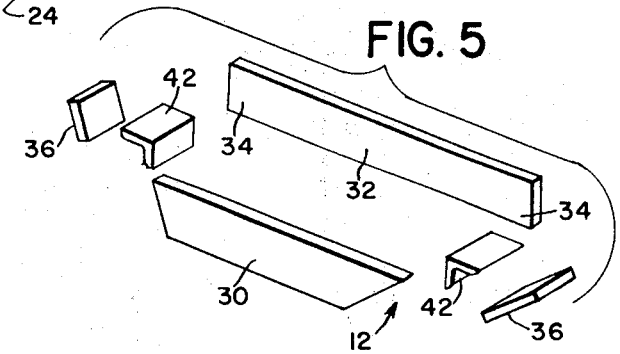
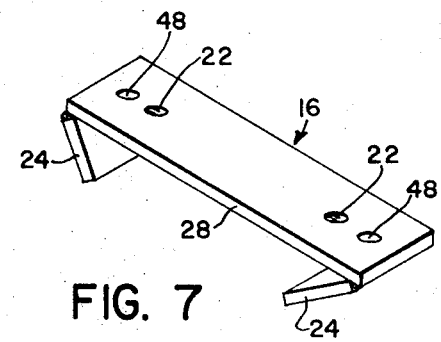
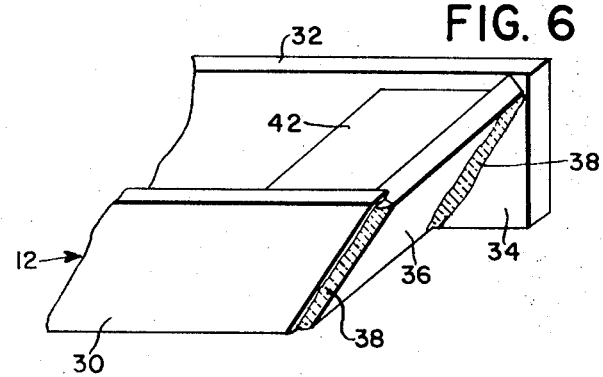
INVENTOR.
C. G. MATSON

MOUNT FOR VIBRATORS

BACKGROUND OF THE INVENTION

The use of vibrators for settling, moving, etc. of material is well known in the field of materials handling, but there is always the problem of mounting the vibrator on the object to be vibrated. In some instances, where the mounting is relatively permanent, the vibrator itself may be welded in place. But in most instances, several mounts are required so that the vibrator may be moved from one locality to another or several vibrators must be provided. Very often the object to be vibrated lacks adequate strength in the area in which the vibrator is mounted and this area must either be built up to withstand the forces or the vibrator must be provided with a special mounting means, of which various types are known, as in U.S. Pat. No. 3,420,480.

SUMMARY OF THE INVENTION

The present invention provides a fabricated structure that amounts to a block or boxlike structure of relatively sturdy metal nature that lends itself to rigid attachment to the container etc. to be vibrated, as by welding. At the same time, this structure provides for addition to the strength of the object and also affords bevel or approximately 45° angle divergent surfaces to which the vibrator itself, or an intermediary element, may be attached by means of complementarily shaped legs supplemented by clamping screws that draw the legs outwardly against the surfaces. In the use of a preferred embodiment, one of the sides of the mount is extended beyond at least one of the end walls to serve as a stop so that the mounting of the vibrator is limited in installation.

DESCRIPTION OF THE DRAWINGS

FIG. 3 is a top view of the mount by itself;

FIG. 4 is a section as seen along the line 4—4 of FIG. 3 but showing the intermediate element in position in broken lines;

FIG. 5 is an exploded perspective, on a reduced scale, of the elements making up the mount;

FIG. 6 is an enlarged fragmentary perspective illustrating one end and corner of the mount; and FIG. 7 is a perspective, generally on the scale of FIG. 5, showing the use of an intermediary element.

DESCRIPTION OF A PREFERRED EMBODIMENT

Figure 1:
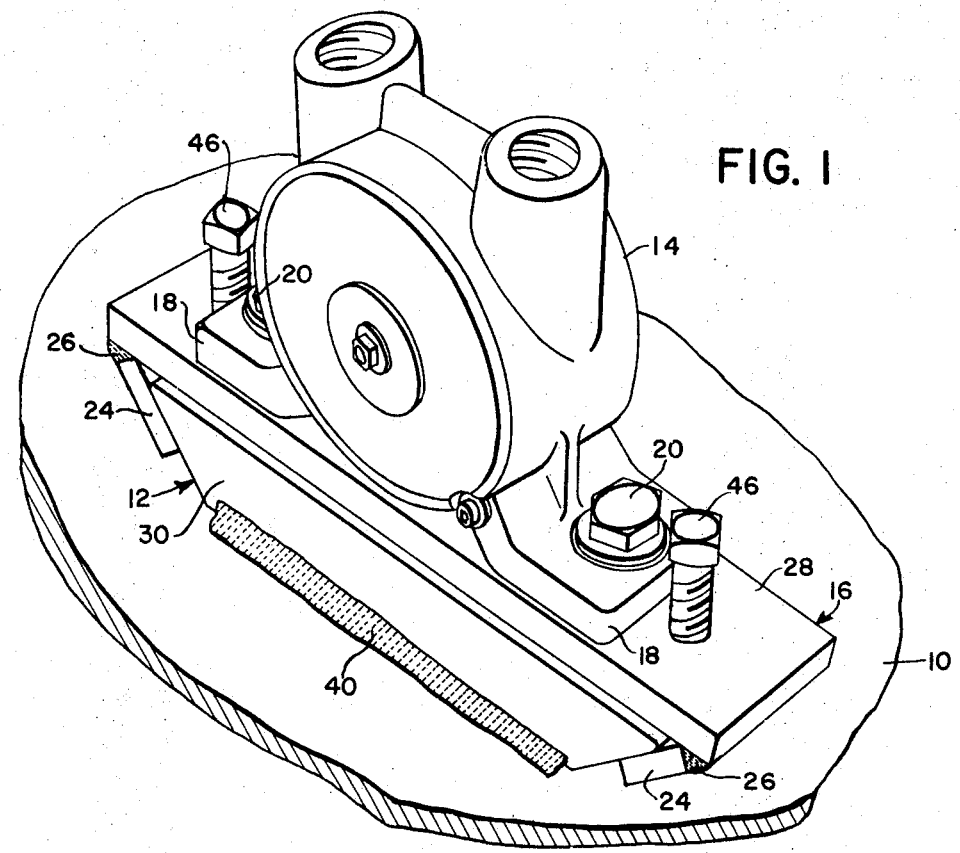
FIG. 1 is a perspective of a vibrator mounted on an object to be vibrated.

The numeral 10 represents a portion of the metal wall structure of an object to be vibrated, such as a concrete mold. Welded to this is a vibrator mount 12 on which a well-known form of rotary vibrator 14 is mounted by means of an intermediary or secondary element 16. In the present case, the vibrator has legs or ears 16 for receiving capscrews 20 which thread securely into tapped bores 22 in the element 16. In other instances, the vibrator may be provided with the element 16 as an integral part thereof, but the mounting to the mount 12 will follow the description below, since the element 16, as part of the vibrator or as a separate element as shown here, will have depending and (here) converging legs 24 welded as at 26 to a steel bar or backbone 28. In the illustrated posture of the device, the vibrator 14 is upright and in this regard the legs 24 depend, but this is by way of reference only, because the concrete mold, as at 10, may have many angularly related walls and several mounts 12 may be attached thereto in different attitudes. The legs 24 converge at angles of generally 45° to the bar 28, for purposes to be described below.

The mount 12 is of special construction, comprising a rigid steel boxlike structure having a pair of elongated parallel sidewalls 30 and 32 of equal height so that, with reference to a horizontal plane, their upper and lower edges are parallel to each other, but the sidewall 30 is trapezoidal and the sidewall 32 is rectangular so that in its lower end portions the length of the sidewall 32 exceeds that of the lower portions of the sidewall 30 in the triangular areas 34. See FIGS. 2, 4, 5 and 6. These areas provide stops to limit movement of the vibrator in one direction when the converging legs 24 of the secondary element 16 are mated with inclined end walls 36 of the mount 12. The end walls 36 are welded to the sidewalls 30 and 32 at 38, duplicating or matching the angles, respectively, of the element legs 24. The mount 12 is itself welded at 40 to the wall 10, it being understood that there is a like weld bead along the lower edge of the mount opposite from that visible in the drawings. This rigidifies the mount with the wall 10.

The mount is further supplemented at each end by a crossmember 42 in the form of a steel angle having the upper and lower free edges of its legs welded at 44 to the associated end wall 36. The members 42 not only contribute to the structural strength of the mount 12 in critical areas but also provide flat upper abutment surfaces against which clamping screws 46, threaded through tapped bores 48 in the element 16, seat when the element and vibrator are mounted on the mount 12 via the mating legs 24 and end walls 36 (FIG. 4).

In use and operation, the mount 12, or as many as may be desired, is, after prefabrication to rigidly unite the components 30, 32, 36 and 42, welded to the object, typically denoted here as the wall 10 of a concrete mold. The vibrator 14, previously attached to or formed with the secondary element 16, is slid sidewise onto the mount 12 and is stopped by the stops 34, which is especially helpful if the slide-on movement is vertical or nearly so. The clamp screws 46 are then tightened and the vibrator becomes in effect a unitary part of the object to be vibrated. Because of the 45° clamping angles among the legs 24 and end walls 36, remarkable holding power results, and the clamp screws need furnish only a portion, say a third, of the clamping force required. Where several mounts 12 are employed, the clamp screws may be easily manually loosened and the vibrator mounted elsewhere on the object.

Figure 2:
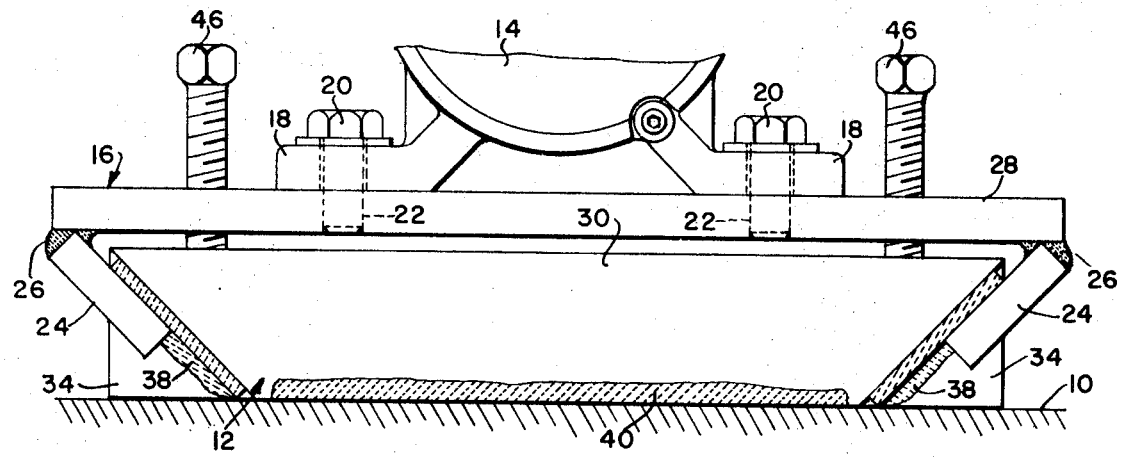
FIG. 2 is a fragmentary elevation of the same.

As best shown in FIG. 2, the legs 24 terminate well above the wall 10 so that additional welding may be provided without interfering with the mounting and dismounting of the vibrator; i.e., such welds may be crosswise of the elongated weld beads 40.

Because the parts may be made from readily available steel stock, the mount and its associated parts may be easily and cheaply fabricated to provide a low-cost but extremely durable construction.

I claim:

1. A vibrator mount for rigid attachment to a walled receptacle or the like to be vibrated, comprising a rigid boxlike structure of relatively heavy metal construction and including a pair of elongated parallel sidewalls respectively having upper and lower edges, the latter adapted to rest on and be secured to the walled container, a pair of opposite end walls rigidly joined to the sidewalls, said end walls diverging outwardly from said sidewall lower edges respectively at angles of approximately 45° to provide for the removable clamping of a vibrator to said end walls, a vibrator mounting element overlying said mount and having downwardly converging legs respectively outwardly of and complementing said diverging end walls, a pair of screw members respectively inwardly of said end walls for exerting upward forces on said element to draw the converging legs into engagement with said end walls, each end wall having an inward abutment surface lying in a plane parallel to the sidewall edges and against which the associated screw member engages, each end wall having rigidly secured hereto an angle member including a top leg providing said abutment surface and a depending bracing leg jointed to the top leg and to said structure.